April 23, 1957     J. R. HOLLINS     2,790,156

TURN SIGNALLING ARRANGEMENT

Filed June 2, 1954     2 Sheets-Sheet 1

INVENTOR
Jesse R. Hollins
BY
ATTORNEY

April 23, 1957  J. R. HOLLINS  2,790,156
TURN SIGNALLING ARRANGEMENT
Filed June 2, 1954  2 Sheets-Sheet 2

INVENTOR
Jesse R. Hollins
BY
ATTORNEY

United States Patent Office 2,790,156
Patented Apr. 23, 1957

2,790,156

TURN SIGNALLING ARRANGEMENT

Jesse R. Hollins, Brooklyn, N. Y.

Application June 2, 1954, Serial No. 433,938

4 Claims. (Cl. 340—81)

This invention relates to turn signalling arrangements for automotive vehicles and, more particularly, to a novel turn signalling arrangement utilizing the parking, stop, and tail lamps on a selected side of the vehicle as flashing turn indicator lamps.

Most automotive vehicles, particularly later models, are equipped with turn signalling systems and, in some States, new vehicles are required by law to be so equipped. The usual turn signalling arrangement comprises a turn signal selector lever mounted on the steering column and selectively operating switch means to connect signal lamps on either side and both ends of the vehicle to the vehicle source of energy through a flasher. Thus, to signal a right turn, the selector lever is operated to flash signal lamps on the right side of the vehicle, and vice versa for a left turn.

Various signal lamp arrangements have been proposed, some utilizing signal lamps separate from the usual vehicle lamps and others utilizing the vehicle parking, tail, and/or stop lamps. In night driving, the vehicle tail lamps are steadily illuminated, as are also the headlamps or parking lamps, dependent upon whether the headlamp control switch is in the parking lamp or headlamp positions. Also, the brake is usually applied in making a turn, resulting in steady burning of the stop lamps.

Consequently, if separate signal lamps are used to flashingly signal a turn, their effectiveness as a signal is considerably diminished by the proximity of the steady burning tail and stop lamps, and of the steady burning parking lamps, if the latter are on. This diminished signal effectiveness is even more true of turn signalling arrangements utilizing the stop, tail, and/or parking lamps. In such case, the change of illumination is only one of degree, the flasher energization merely increasing the illumination periodically from one steady level to a momentarily higher level.

The decrease in signal effectiveness is even more pronounced where the tail and stop lamps are combined in a single unit or are separate filaments in a single lamp. With one lamp or filament in the unit burning steadily and the other being flashed, the difference in illumination is insufficient to provide a completely adequate turn signal.

With the foregoing in mind, the present invention is directed to a novel turn signalling arrangement utilizing the vehicle parking, tail, and stop lamps. The arrangement includes a novel three-position turn selector switch which, in its off or neutral position, connects both parking lamps and both tail lamps to the parking lamp tap and tail lamp tap, respectively, of the headlamp control switch, and both stop lamps to the brake-operated stop lamp switch. In either turn signalling position of the switch, the parking and tail lamps on one side of the vehicle are disconnected from the headlamp control switch, and the stop lamps on such side, are disconnected from the brake operated switch; and all these lamps on the selected side of the vehicle corresponding to the turn direction are connected to the vehicle electric energy source through a flasher.

Thus, in signaling a turn, the parking, tail and stop lamps on one side of the vehicle are all flashed between "full off" and "full on." Hence, there is no diminishing of the signalling effect due to steady burning lamps on the "signal" side of the vehicle, and the signal effect is augmented both by flashing the tail and stop lamps in synchronism and by the contrast between alternating "full off" and "full on" illumination of the lamps flashing the turn signal. The parking, tail, and stop lamps on the opposite side of the vehicle remain steadily illuminated.

For an understanding of the invention principles, reference is made to the following description of typical embodiments thereof as illustrated in the accompanying drawings. In the drawings.

Figure 1:
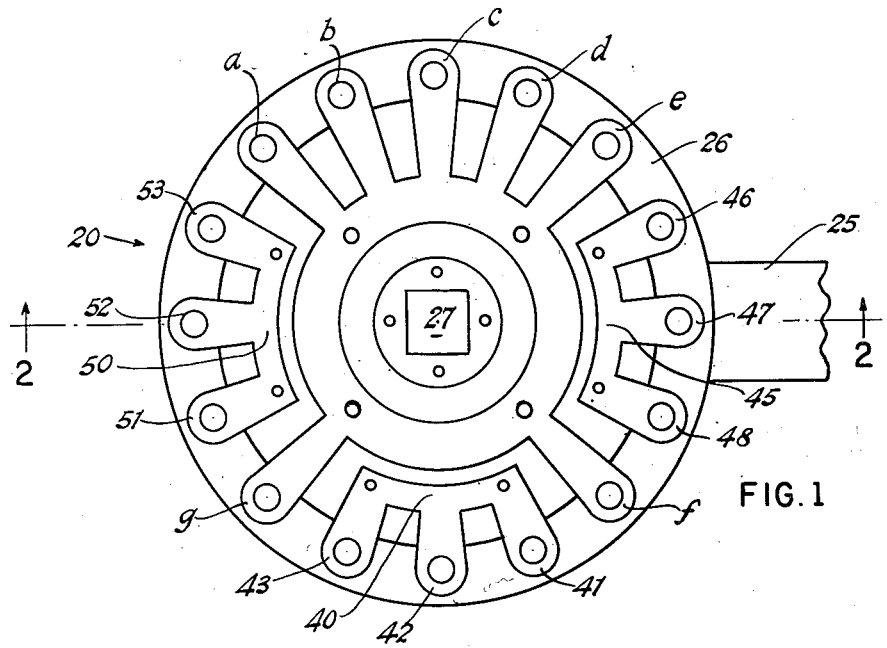
Fig. 1 is a partial plan view of one form of turn selector switch embodying the invention.
Figure 2:
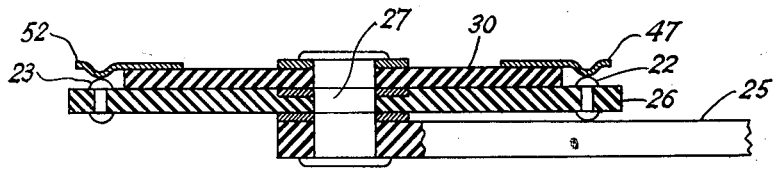
Fig. 2 is a diametric sectional view on the line 2—2 of Fig. 1.
Figure 3:
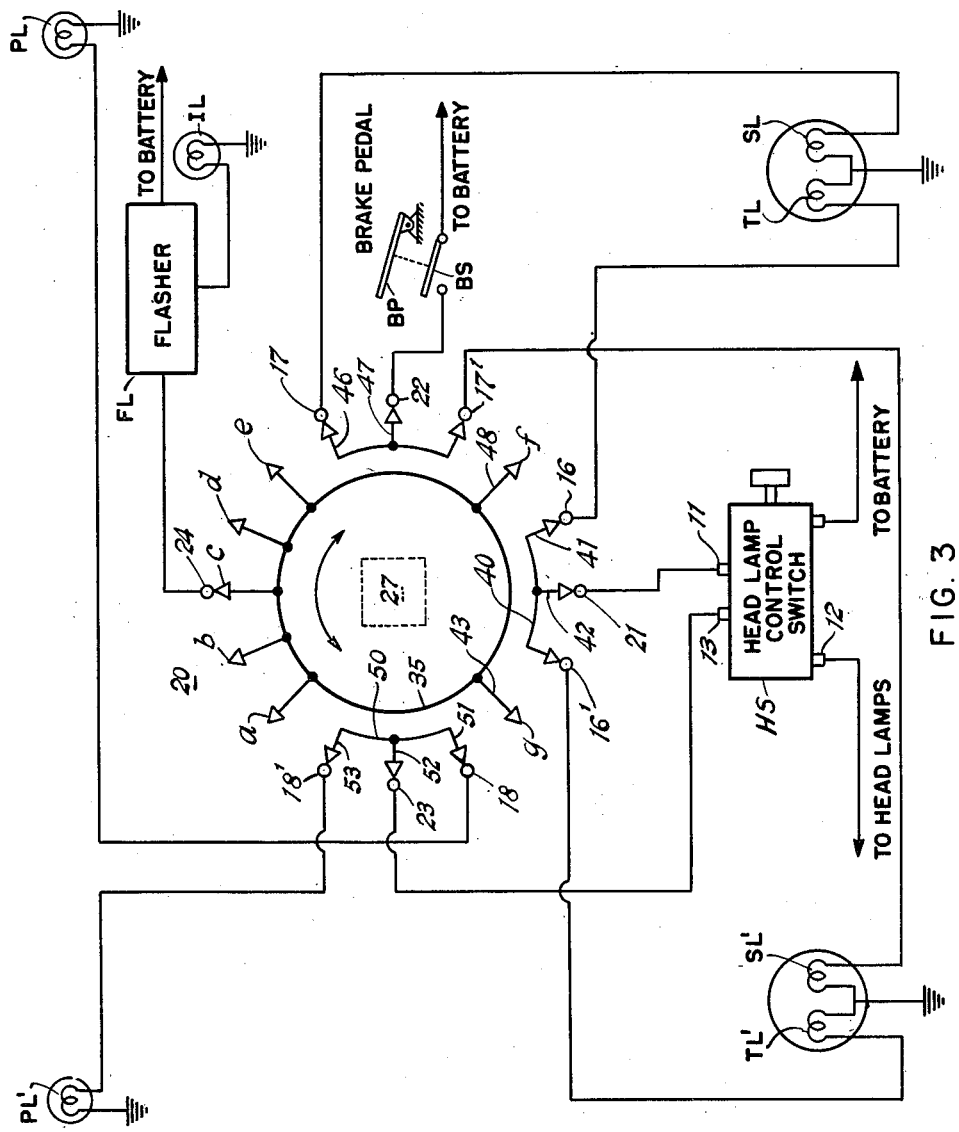
Fig. 3 is a schematic wiring diagram of the invention turn signalling arrangement.

Referring to Figs. 1, 2 and 3, the invention turn signalling arrangement is illustrated as incorporated in an automotive vehicle having a headlamp control switch HS, a brake switch HS, closed whenever brake pedal BP is depressed to apply the brakes, parking lamps PL, PL', tail lamp filaments TL, TL', and stop lamp filaments SL, SL'. In the particular arrangement illustrated, the tail and stop lamp means comprise separate filaments in the same bulb. However, the invention is equally applicable to automotive vehicles having separate tail and stop lamp bulbs in the same unit or in independent units.

Switches BS and HS are connected to the usual vehicle source of energy, such as a generator charged battery, and, in the usual manner, headlamp switch is provided with headlamp, parking lamp, and tail lamp taps. Tail lamp tap 11 is connected to the battery in either "on" position of switch HS, whereas headlamp tap 12 and parking lamp tap 13 are connected to the battery in alternate "on" positions of switch HS. All of the several lamp filaments have one terminal grounded in the usual manner.

The invention arrangement includes a turn selector switch 20, having an operating handle 25, and a flasher FL. Switch 20 is interposed electrically between switch HS, switch BS and flasher FL, and lamp means PL, TL and SL. Flasher FL, which may be a thermostatically operated "on-off" switch, is connected to the vehicle source of energy and has connected thereto a grounded indicator or pilot lamp IL which is flashed whenever flasher FL is energized. Lamp IL is usually mounted on the dash board or on the turn selector switch.

Switch 20 includes a base 26 of dielectric material on which is pivotally mounted a shaft 27 having a circular bearing portion engaged in a circular hole in base 26 and polygonal, preferably squared, ends. Handle 25 is secured to one polygonal end of shaft 27 and a dielectric disk 30 is secured to the other polygonal end thereof. Disk 30 is thus oscillatable by handle 25 relative to base 26.

Base 26 carries a tail lamp contact 21 connected to tail lamp tap 11, a stop lamp contact 22 connected to brake switch BS, a parking lamp contact 23 connected to parking lamp tap 13, and a flasher contact 24 connected to the output terminal of flasher FL. These four contacts are preferably spaced about 90° apart and located uniform distances from the periphery of disk 30.

On either side of contact 21, base 26 carries contacts 16, 16' respectively connected to tail lamp filaments TL, TL'. Similarly, contacts 17, 17' on base 26 on either side of contact 22 are connected respectively to stop lamp filaments SL and SL'; and contacts 18, 18' on either side of contact 23 are connected respectively to parking lamps PL, PL'. The lamps without the "prime" are assumed to be on the right side of the vehicle and those with the "prime" on the left side of the vehicle.

Dielectric disk 30 has secured thereto a circular metallic contact strip 35 having five fingers, a, b, c, d and e spaced equiangularly from each other, and two contact fingers f and g respectively substantially diametrically opposite fingers a and e. The fingers project beyond the rim of disk 30 to align with the contacts carried by base 26. In the "off" or "neutral" position of switch 20, finger c is engaged with flasher contact 24, finger f is spaced midway between contacts 16 and 17', and finger g is spaced midway between contacts 16' and 18.

Disk 30 carries an arcuate tail lamp contact strip 40 having three fingers, 41, 42, 43. In the off position of switch 20, fingers 41, 42 and 43 are respectively engaged with contacts 16, 21 and 16'. An arcuate stop lamp contact switch 45 on disk 30 has fingers 46, 47 and 48 respectively engaged with contacts 17, 22 and 17' in the neutral position of switch 20, and an arcuate parking lamp contact strip 50 on disk 30 has contact fingers 51, 52 and 53 respectively engaged with contacts 18, 23 and 18' in the neutral position of switch 20.

Referring to Fig. 3, it will be observed that, in the illustrated neutral position of switch 20, tail lamp filaments TL, TL' are connected to tail lamp tap 11 through contact 21, strip 40, and contacts 16, 16'; stop lamp filaments SL, SL' are connected to brake switch BS through contact 22, strip 45, and contacts 17, 17'; and parking lamps PL, PL' are connected to parking lamp tap 13 through contact 23, strip 50, and contacts 18, 18'. Thus, wherever the brakes are applied, lamp filaments SL, SL' will be steadily energized, lamp filaments TL, TL' will be steadily energized whenever switch HS is in either "on" position, and lamps PL, PL' will be steadily energized whenever switch HS is in the "parking lamps on" position.

To signal a right turn, lever 25 is moved one step clockwise. In this position of disk 30, finger b engages contact 24, finger e engages contact 17, finger 46 engages contact 22, finger 47 engages contact 17', finger 48 occupies the former position of finger f, finger f engages contact 16, finger 41 engages contact 21, finger 42 engages contact 16', finger 43 occupies the former position of finger g, finger g engages contact 18, finger 51 engages contact 23, finger 42 engages contact 18', and finger 43 occupies the former position of finger a.

Thus, contacts 17, 16 and 18 are connected to flasher FL through fingers e, f and g, strip 35, finger b and contact 24, so that the right lamp means SL, TL and PL are flashed between the "full on" and "full off" conditions. Left stop lamp filament SL' remains connected to switch BS through contacts 17', 22 and fingers 46, 47 of strip 45. Left tail lamp filament TL' remains connected to tap 11 through contacts 21, 16' and fingers 41, 42 of strip 40. Left parking lamp PL remains connected to tap 13 through contacts 23, 18' and fingers 51, 52 of strip 50. Thus, the left side lamps remain steadily illuminated while all three right side lamps are flashed by flasher FL.

To signal a left turn, handle 25 is moved counter-clockwise one step, and the left side lamps are thus connected to flasher FL through strip 35 while the right side lamps are still connected to switches HS and BS.

Figures 4, 5, 6:
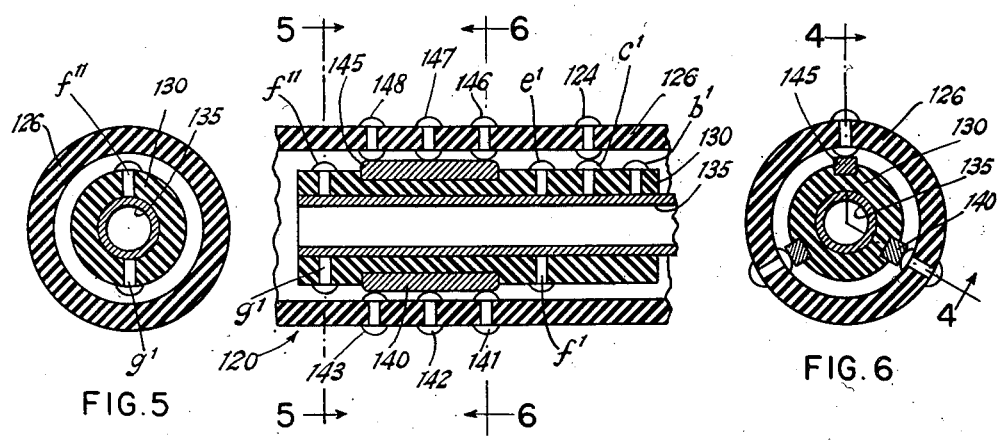
Fig. 4 is a longitudinal sectional view of another form of turn selector switch embodying the invention, taken on the line 4—4 of Fig. 6.
Figs. 5 and 6 are transverse sectional views of the switch of Fig. 4, taken on the correspondingly numbered lines of Fig. 4.

The selector switch 20 is illustrated as an oscillatable switch. However, this switch may take other forms within the scope of the invention. A reciprocable slide type of switch is shown in Figs. 4, 5 and 6.

Referring to these figures, a selector switch 120 is illustrated as including a cylindrical mounting sleeve 126, of dielectric material, within which is slidably telescoped a dielectric sleeve 130 fitted on a conductive metal cylinder or tube 135. Sleeve 130 and tube 135 are slidable as a unit axially of sleeve 126 but fixed against rotation therein by suitable means not shown. Such sliding may be effected by linkage (not shown) connected to a turn selector lever.

In the illustrated "neutral" or "off" position switch tail lamp tap contact 121 is connected to tail lamp contacts 116, 116' by a conductive strip or bar 140, brake switch contact 122 is connected to stop lamp contacts 117, 117' by a conductive strip or bar 145, and parking lamp tap contact 123 is connected to parking lamp contacts 118, 118' by a conductive strip or bar 150. Flasher contact 124 is engaged with contact c' which is connected to sleeve 135, as are also the other lettered contacts such as b', e', f', f'', g', etc.

To signal a right turn, the sleeve-tube unit 130—135 is moved one position to the left. This connects right tail lamp contact 116 to flasher contact 124 through contacts f'', b', and sleeve 135. The right stop lamp and right parking lamp are connected to the flasher in a similar manner. The left tail lamp, stop lamp, and parking lamp contacts 116', 117' and 118' remain connected to tail lamp tap, brake switch, and parking lamp tap contacts 121, 122 and 123 through strips 140, 145 and 150, respectively. The right side lamps are thus all flashed while the left side lamps burn steadily.

To signal a left turn, the sleeve-tube unit is moved from "neutral" one position to the right. This connects the left side lamps to flasher contact 124 leaving the right side lamps connected to their steadily energized conductive strips.

While a specific embodiment of the invention has been shown and described in detail to illustrate the application of the invention principles, it will be understood that the invention may be embodied otherwise without departing from such principles.

What is claimed is:

1. In combination with an automotive vehicle having a source of electrical energy, a headlamp control switch and a brake pedal operated switch connected to said source, said control switch having parking and tail lamp taps, a pair of tail lamp means, a pair of stop lamp means, and a pair of parking lamp means, the lamp means of each pair being mounted on opposite side of the vehicle; a turn signalling arrangement comprising a flasher connected to said source; a turn signalling switch; circuit means operatively interconnecting said turn signalling switch to said control switch tap, said brake pedal operated switch, said lamp means, and said flasher; said turn signalling switch having a neutral position connecting said tail lamp and parking lamp means to said tail lamp and parking lamp taps, respectively, and said stop lamp means to said brake operated switch for steady illumination upon operation of said control switch and the brake pedal, respectively; and a pair of turn signalling positions each disconnecting all of said lamp means on one side of the vehicle from said control and brake operated switches and connecting all the lamp means on such one side of the vehicle to said flasher for intermittent illumination, while maintaining all the lamp means on the opposite side of the vehicle connected to said control and brake pedal operated switches, respectively, for normal steady illumination thereof.

2. A turn signalling arrangement as claimed in claim 1 in which said turn signalling switch comprises a pair of relatively movable dielectric members, one carrying contacts adapted to be connected to said control and brake pedal operated switches, said lamp means, and said flasher; and the other member carrying contact means selectively engageable with said contacts.

3. A turn signaling arrangement as claimed in claim 2 in which said dielectric members are disks relatively oscillatable about a common axis.

4. A turn signaling arrangement as claimed in claim 2 in which said dielectric members have relative longitudinal movement.

References Cited in the file of this patent

UNITED STATES PATENTS

| | | |
|---|---|---|
| 1,278,492 | Miller | Sept. 10, 1918 |
| 1,443,763 | Smith | Jan. 30, 1923 |
| 1,499,236 | McMillan | June 24, 1924 |
| 1,558,324 | Wiemer | Oct. 20, 1925 |
| 2,210,619 | Farrand | Aug. 6, 1940 |
| 2,238,394 | Murray | Apr. 15, 1941 |
| 2,267,743 | Murray | Dec. 30, 1941 |
| 2,321,803 | Falge | June 15, 1943 |
| 2,562,274 | Hollins | July 31, 1951 |
| 2,607,840 | Hollins | Aug. 19, 1952 |
| 2,672,531 | Stevenson | Mar. 16, 1954 |